Figure 1:
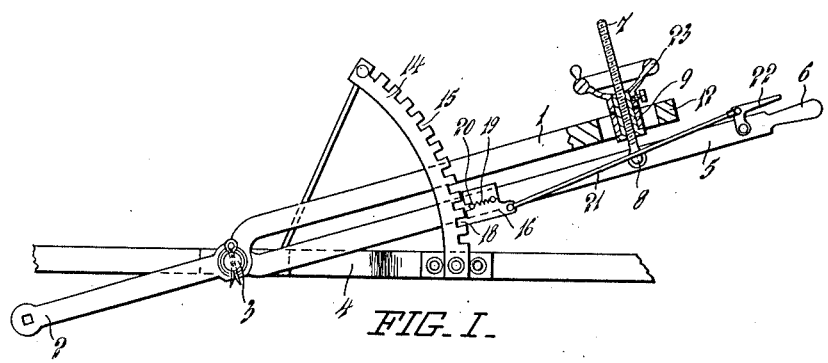

G. W. HUTCHINSON.
LEVER.
APPLICATION FILED APR. 30, 1912.

1,040,337. Patented Oct. 8, 1912.

Witnesses:—
Charles B Crompton
Fred Pohl

Inventor.
G. W. Hutchinson
By Gordon Marks
Attorney.

UNITED STATES PATENT OFFICE.

GEORGE WILLIAM HUTCHINSON, OF WALTON, WAIKATO, NEW ZEALAND.

LEVER.

1,040,337.  Specification of Letters Patent.  Patented Oct. 8, 1912.

Application filed April 30, 1912. Serial No. 694,252.

*To all whom it may concern:*

Be it known that I, GEORGE WILLIAM HUTCHINSON, a citizen of the Dominion of New Zealand, and residing at Walton, Waikato, in the Provincial District of Auckland, in the Dominion of New Zealand, have invented certain new and useful Improvements in Levers, of which the following is a specification.

The invention relates to levers employed upon agricultural implements and more particularly to the lever by which the wheel of a plow, cultivator, or the like is adjusted to regulate the depth of the plowing, cultivation, or similar operation.

The objection of the invention is to provide means whereby fine adjustments may be more easily made than hitherto.

According hereto, I provide an operating arm pivoted upon the fulcrum of the lever and connected thereto by a pivoted screw passing through a nut pivoted in the lever. The arm has a spring returned pawl engaging the notches of a quadrant rack. For rough adjustments the spacing of the notches of the rack is relied upon in the ordinary way. Fine adjustments are made by turning the nut.

I will now further describe my invention and the operation thereof by the aid of the drawing wherein:—

Figure 2:
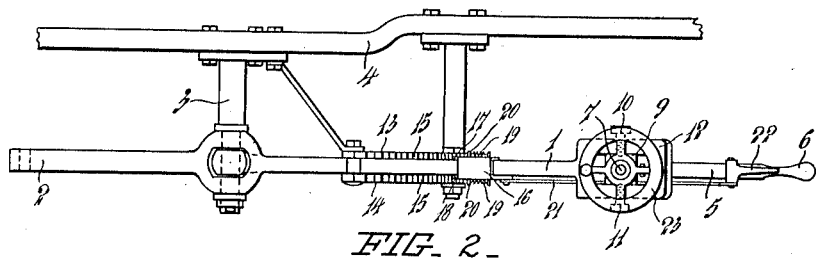
Figure 3:
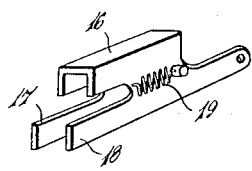

Figure 1, is a side elevation, and Fig. 2, a plan of a lever and parts. Fig. 3, is an end perspective elevation of a pawl bracket.

The lever 1, adapted for connection at its front end 2 to a land wheel, is pivoted upon a pin 3 projecting from the beam 4 of the implement and is cranked upwardly, rearwardly of pin 3. An arm 5 terminating in a handle 6 is pivoted upon said pin 3 and a screwed spindle 7 pivoted upon it at 8 passes through a nut 9 which is mounted trunnion wise, by means of the pins 10 and 11, in a loop 12 formed in the lever, and is turnable by the hand wheel 23. The lever and the arm work between a double quadrant rack, the two parts 13 and 14 of which are fixed to the beam 4 and have corresponding notches 15.

A pawl bracket 16 (see Fig. 3) sliding upon the arm, has the projections 17 and 18 which engage the notches of the rack. The pawl bracket is drawn toward the quadrant rack by tension springs 19 one upon each side, each spring being secured to said bracket at one end and at the other end of a pin 20 projecting from the arm. The pawl bracket may be withdrawn from the quadrant rack by a rod 21 connected to a bell crank lever 22 pivoted upon the arm. The lever 1 may be maintained at approximately the desired angle by the pawl projections engaging in the quadrant notches and finer adjustment may then be made by turning the wheel nut and thus moving the lever nearer to, or farther away from, the arm as desired.

What I do claim and desire to secure by Letters Patent of the United States is:—

1. In combination, a lever, an arm, means for roughly adjusting said arm and lever, a screw threaded member pivotally connected at one end to one of said parts, a nut rotatably mounted in the other of said parts and engaging said screw threaded member and means for rotating said nut for adjusting the lever relatively to the arm.

2. In combination, a lever, an arm, means for roughly adjusting said arm and lever, a screw threaded rod pivotally connected at one end to said arm, a nut rotatably mounted in said lever and engaging said screw threaded rod, and means for rotating said nut for adjusting the lever relatively to the arm.

3. In combination, a lever, an arm, means for roughly adjusting said arm and lever, a screw-threaded member pivotally connected at one end to one of said parts, a nut rotatably and pivotally mounted in the other of said parts and engaging said screw-threaded rod, and means for rotating said nut for adjusting the lever relatively to the arm.

4. In combination, a lever, an arm, pivoted on said lever, means for roughly adjusting said arm and lever, a screw-threaded rod pivotally connected at one end to said arm, a nut rotatably mounted in said lever and engaging said screw-threaded rod, and a hand wheel for rotating said nut for adjusting the lever relatively to the arm.

5. In combination, a lever, an arm, means for roughly adjusting said arm and lever, a screw-threaded member pivotally connected at one end to one of said parts, a block mounted on trunnions in the other of said parts, a nut rotatably mounted in said block and engaging said screw-threaded member and means for rotating said nut for adjusting the lever relatively to the arm.

6. In combination, a lever, an arm, pivoted thereto, means for roughly adjusting said arm and lever, a screw-threaded rod pivotally connected at one end to said arm, a block mounted on trunnions in said lever, a nut rotatably mounted in said block and engaging said screw-threaded rod, and means for rotating said nut for adjusting the lever relatively to the arm.

7. In combination, a lever, an arm, pivoted thereto, a notched quadrant, a pawl on said arm for engaging the notches of said quadrant, means on said arm for operating said pawl to allow rough adjustments of the arm and lever, a screw-threaded rod, pivotally connected at one end to said arm, a block mounted on trunnions in said lever, a nut rotatably mounted in said block and engaging said screw-threaded rod, and means for rotating said nut for adjusting the lever relatively to the arm.

8. In combination, a lever, an arm, a pawl bracket on one of said parts comprising a channel-shaped plate surrounding the part, a notched quadrant, projections on said pawl bracket engaging the notches of the quadrant, springs connected to pins on said pawl bracket and part for holding the pawl in engagement with the quadrant, a crank lever connected to said pawl bracket for disengaging it from said quadrant, a screw-threaded member pivotally connected to said arm, a nut rotatably mounted in said lever and engaging said screw-threaded member and means for rotating said nut for adjusting the lever relatively to the arm.

In testimony whereof I have signed my name to this specification in the presence of two witnesses.

GEORGE WILLIAM HUTCHINSON.

Witnesses:
ARTHUR LEWITT FERNEYHOUGH,
FLORA ELIZABETH MILNE WILSON.